United States Patent
Blanchard et al.

(10) Patent No.: US 8,738,519 B2
(45) Date of Patent: May 27, 2014

(54) WAIVER DECISIONING

(75) Inventors: Matthew T. Blanchard, St. Louis, MO (US); Samantha S. Melting, Charlotte, NC (US); Ruth A. Vega, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/088,504

(22) Filed: Apr. 18, 2011

(65) Prior Publication Data

US 2012/0265672 A1 Oct. 18, 2012

(51) Int. Cl.
*G06Q 40/00* (2012.01)

(52) U.S. Cl.
USPC .................................. 705/39; 705/40; 705/35

(58) Field of Classification Search
USPC .............. 705/40, 35, 37, 39, 1.1, 34; 606/191
See application file for complete search history.

(56) References Cited

U.S. PATENT DOCUMENTS

| | | | | |
|---|---|---|---|---|
| 6,026,382 | A * | 2/2000 | Kalthoff | 705/35 |
| 6,039,772 | A * | 3/2000 | Orr | 44/359 |
| 7,660,764 | B2 | 2/2010 | Jemella | |
| 7,672,888 | B2 * | 3/2010 | Allin et al. | 705/35 |
| 7,797,210 | B2 * | 9/2010 | Eichhorn et al. | 705/35 |
| 7,818,251 | B2 * | 10/2010 | Frazier et al. | 705/40 |
| 7,877,302 | B2 * | 1/2011 | Allin et al. | 705/29 |
| 7,933,790 | B2 * | 4/2011 | Trickel | 705/7.11 |
| 7,983,972 | B2 * | 7/2011 | Allin et al. | 705/35 |
| 8,086,981 | B2 * | 12/2011 | Lai et al. | 716/111 |
| 2002/0046187 | A1 * | 4/2002 | Vargas et al. | 705/67 |
| 2002/0069167 | A1 * | 6/2002 | Conlow | 705/40 |
| 2002/0123971 | A1 * | 9/2002 | Maritzen et al. | 705/64 |
| 2003/0110129 | A1 * | 6/2003 | Frazier et al. | 705/40 |
| 2005/0188336 | A1 * | 8/2005 | Mortensen et al. | 716/5 |
| 2005/0289051 | A1 * | 12/2005 | Allin et al. | 705/40 |
| 2007/0100747 | A1 * | 5/2007 | Franklin et al. | 705/39 |
| 2008/0046350 | A1 * | 2/2008 | Allin et al. | 705/35 |
| 2009/0099965 | A1 * | 4/2009 | Grant, IV | 705/41 |
| 2010/0057613 | A1 * | 3/2010 | Isralow | 705/41 |
| 2010/0312697 | A1 * | 12/2010 | Fracchia et al. | 705/41 |
| 2011/0191241 | A1 * | 8/2011 | Blain et al. | 705/42 |
| 2011/0231314 | A1 * | 9/2011 | Sears et al. | 705/43 |
| 2012/0078766 | A1 * | 3/2012 | Rose et al. | 705/35 |
| 2012/0166264 | A1 * | 6/2012 | Shum et al. | 705/14.17 |
| 2012/0179604 | A1 * | 7/2012 | Blain et al. | 705/40 |
| 2012/0179605 | A1 * | 7/2012 | Blain et al. | 705/40 |

OTHER PUBLICATIONS

Feddis, N. E. (2007). Will overdraft take a bad bounce? American Bankers Association.ABA Banking Journal, 99(12), 48-48,52.*
Gigi, B. A. (2008, Dec. 26). Mortgage Do-Overs: Five ways that banks will work with you to save your home from foreclosure. Newsday.*
Thai Newspaper Highlights—May 18, 2009. AsiaPulse News.*

\* cited by examiner

*Primary Examiner* — Kelly Campen
(74) *Attorney, Agent, or Firm* — Banner & Witcoff, Ltd.; Michael A. Springs

(57) ABSTRACT

A system and method of identifying one or more waivers for waiving a fee associated with an account of a customer at a financial institution. The system and method may include identifying, based one or more criteria of the account, customer, and the like, one or more waivers applicable to the account, customer, and the like. The applicable waivers may be provided for selection. In some examples, a history of all waivers associated with the account or customer may also be provided.

21 Claims, 9 Drawing Sheets

FEES

WAIVER HISTORY

STATUS: ALL

| WAIVER | DATE PLACED | FEE DESC. | WAIVER REASON | WAIVER SUB-REASON | START DATE | EXP DATE | PLACED BY |
|---|---|---|---|---|---|---|---|
| Waiver 10 | | | | | | | |
| Waiver 1 (EXP) | | | | | | | |

CUSTOMER NAME: CUSTOMER 1
ACCOUNT INFORMATION

WAIVER DECISIONING

BACKGROUND

Industries today are constantly looking for ways to improve customer service, provide customer assistance, gain new customers, and the like. In the financial services industry, the use of fee waivers is a popular way to reward long-standing customers, encourage new customers or existing customers to open new products (e.g., new accounts, additional accounts, different types of accounts, and the like) or enroll in new services (e.g., online banking, electronic bill pay, and the like). Fee waivers are generally used at financial institutions for various reasons and may be applied through manual or systematic processes.

Fee waivers may allow for customers to be exempt from paying a fee associated with an account, service, and the like. However, conventional systems have very few controls over how waivers are applied, who is eligible for waivers, when a waiver expires, and the like. Leaving fee waiver decisions up to individual employees often creates inconsistency in the application of fee waivers and can result in lower adherence rate to the policy of the business. Further, conventional systems allow very little, if any, tracking of fee waivers that are currently applied to an account or fee or were applied and have expired, who applied the fee waiver, and the like. Accordingly, a system and method of identifying appropriate fee waivers for customers based on criteria of the customer, customer account, and the like, as well as providing historical tracking of the fee waivers, would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, systems and methods of identifying one or more waivers available to waive a fee associated with a customer or account of a financial institution are presented. In some examples, a transaction request may be received and a customer and one or more accounts associated with the customer and/or the transaction may be identified. In some arrangements, a fee may be identified for one or more accounts, services, and the like associated with the customer. One or more waivers available for the identified fee may be determined based on criteria of the customer, account, fee, transaction, and the like. The available waivers may then be provided for selection. In some examples, a history of any waivers associated with the customer, account, and the like may also be provided.

In at least some examples, a user may wish to select a discretionary waiver (e.g. a waiver not identified by the system as being appropriate for this fee, customer, and the like). Selection of a discretionary waiver may be performed and may require approval, such as supervisor approval. In at least some other aspects, a user may desire to alter a feature of the selected waiver (e.g., a length of time the waiver will be applied to the fee). Alteration of a feature of the waiver may be performed and may require approval, such as supervisor approval.

BRIEF DESCRIPTION OF THE DRAWINGS

The present disclosure is illustrated by way of example and not limited in the accompanying figures in which like reference numerals indicate similar elements.

FIG. 5 illustrates one example user interface displaying waiver history information according to one or more aspects described herein.

FIG. 7 illustrates an example user interface for providing approval, such as supervisor approval, to select a waiver, such as a discretionary waiver, or adjust a characteristic of a waiver according to one or more aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
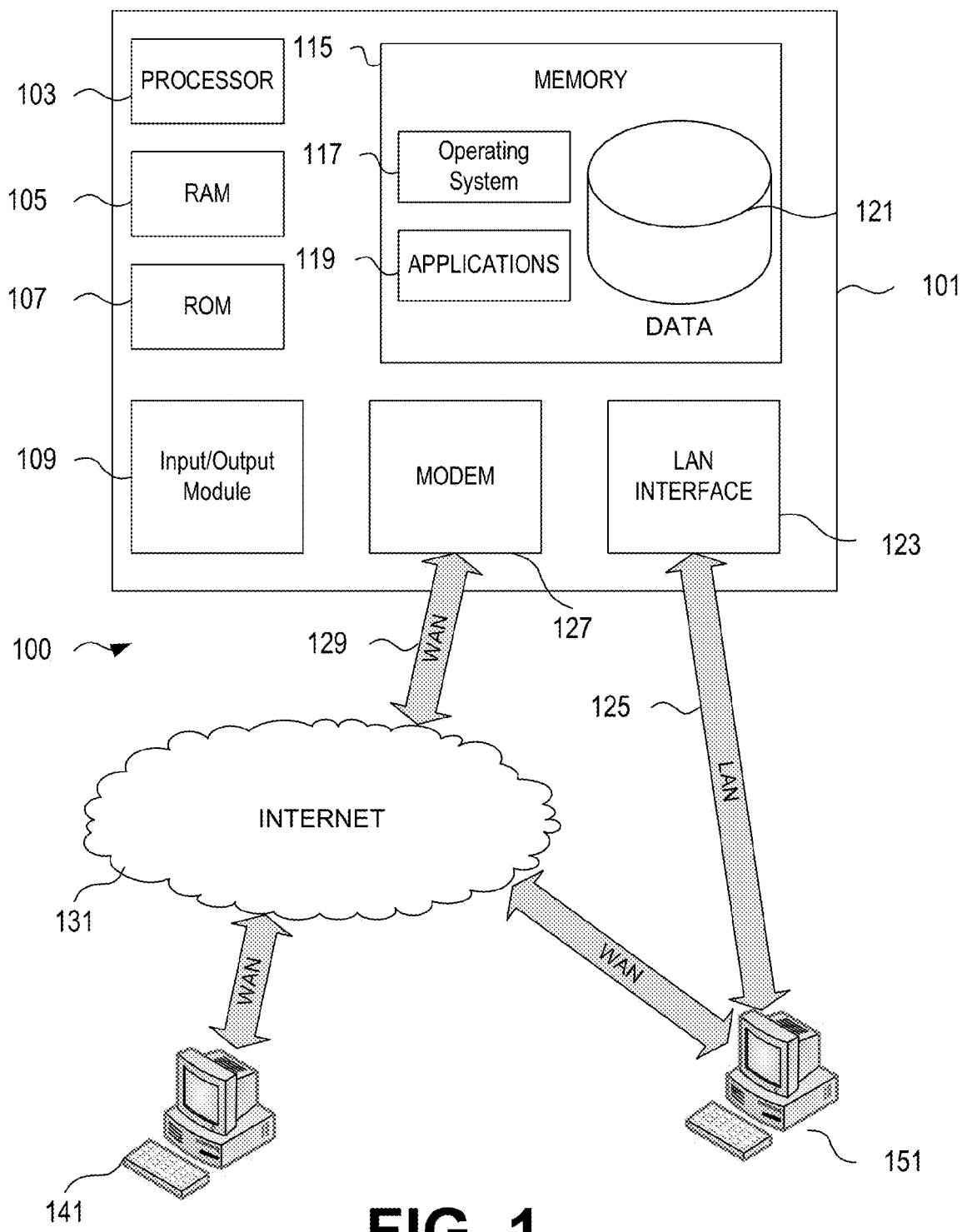
FIG. 1 illustrates an example operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computing device 101 may have a processor 103 for controlling overall operation of the device and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the server 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in various businesses or corporate entities, such as financial institutions, to control the use of fee waivers and track fee waivers. In some examples, a fee waiver may prevent a fee from being charged to a customer. For instance, a fee waiver may include a code assigned to an account of a customer or user that prevents a fee (such as an identified fee) from being assessed to the customer. The code may be applied by, for instance, an associate, such as a banking associate at a financial institution. The fee waiver may prevent a customer from being charged a fee typically associated with an account, loan, service, and the like. Various types of fees and fee waivers will be discussed more fully below.

Many conventional systems allow for any type of waiver to be applied to any type of fee, with little or no tracking of the waiver, why it was applied, who applied it, and the like. However, this may result in waivers being applied to accounts, customers, and the like who are not eligible for the fee waiver, continuing a fee waiver after the waiver should have expired, and the like. Accordingly, the systems and methods described herein may identify appropriate waivers to be applied to an account, customer, and the like based on various criteria, such as account criteria, customer criteria, transaction criteria, and the like, as will be discussed more fully below. In some arrangements, an employee of the financial institution applying a waiver to an account may select, from the waivers identified as applicable to the customer, account, identified fee, and the like, an appropriate waiver. In other examples, selection of the waiver from the list of applicable waivers may be performed automatically.

In some examples, the waiver identification and processing system may allow for a user to place an applicable waiver on a customer account to prevent the customer from being charged an identified fee. The fee waiver may be in a designated category and may include a length of time for which the customer is exempt from the fee. The waiver processing system may capture the fee type and incorporate a reason for the fee waiver. The fee waiver may include qualifications for such waiver and the placement of the waiver to the specified account may include satisfaction of those qualifications. In some arrangements, the waiver identification and processing system may provide fee waiver information in historical record form.

In some examples, the waiver identification and processing system may be customizable and modifiable. For instance, the system may allow for the manipulation of various aspects as desired by an administrator, defined business needs, and the like. For example, the waiver identification and processing system may include a user maintenance tool that may provide flexibility to modify the underlying business rules that drive the waiver identification and processing logic and functionality of the system. Stated differently, the user maintenance tool may allow for adjustment of qualifications for waivers, waiver eligibility criteria, length of time associated with a waiver, definition of new waivers or waiver types, and the like.

Figure 2:
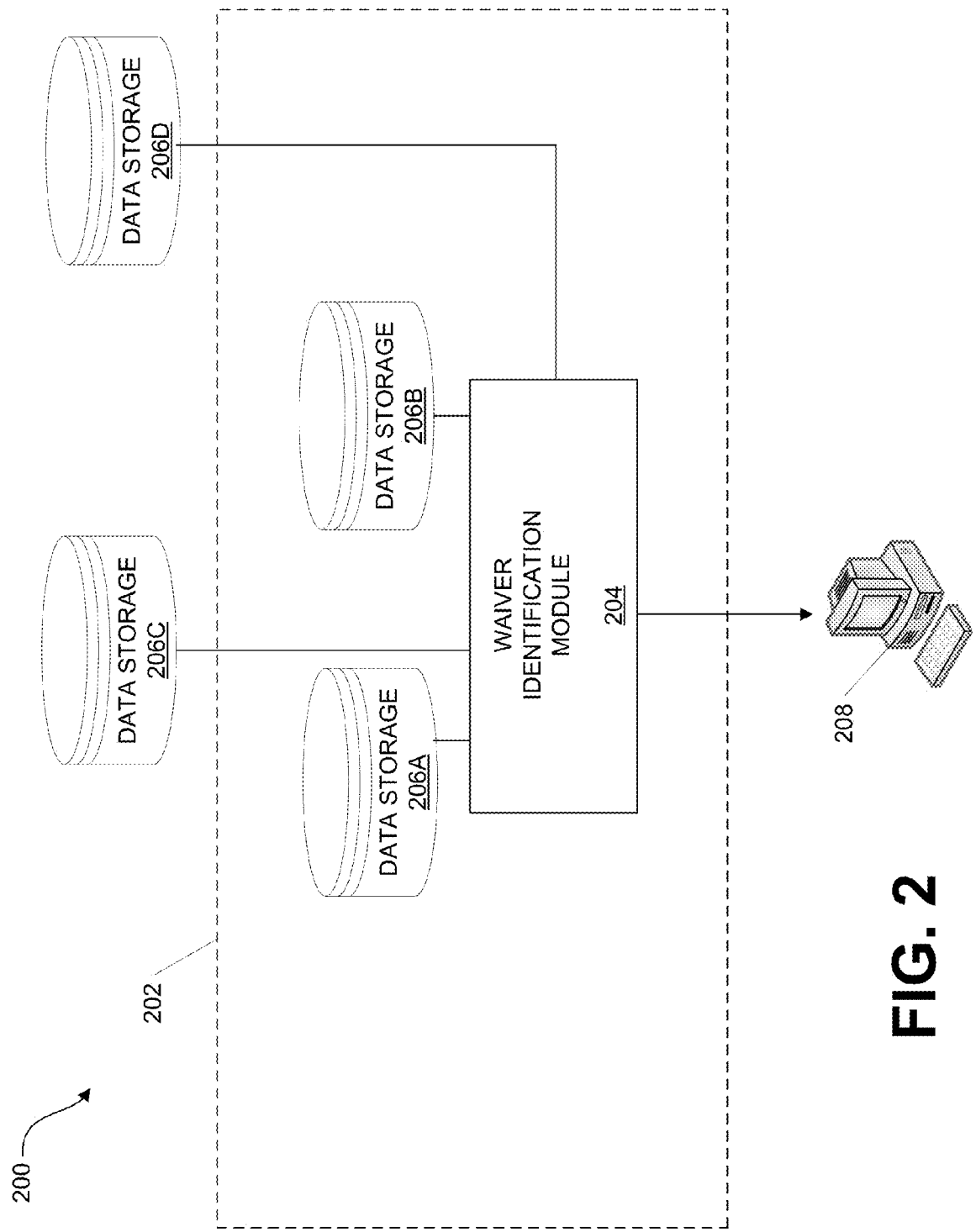
FIG. 2 illustrates an example system for identifying one or more waivers available or applicable to an account, customer, and the like according to one or more aspects described herein.

FIG. 2 illustrates one example waiver processing system for determining appropriate waivers for an account, customer, transaction, and the like. The system 200 may be contained within an entity 202, such as a financial institution. Additionally or alternatively, the monitoring system 200 may be external to or separate from the entity 202 implementing the waiver processing system. The waiver processing system 200 may include a waiver identification module 204. The waiver identification module 204 may be connected (e.g., via a network such as the Internet, intranet, and the like) to one or more data storage modules 206*a*-206*d*. The data storage modules 206*a*-206*d* may be internal to the entity 202, such as data storage modules 206*a* and 206*b*, or may be external to the entity, such as data storage modules 206*c* and 206*d*.

The data storage modules 206*a*-206*d* may store information regarding customers, accounts, and the like associated with the entity 202. For instance, the data storage modules 206*a*-206*d* may store information about various customers, such as location information, length of time they have been a customer of the financial institution, types of accounts they hold, and the like. The data storage modules 206*a*-206*d* may also store account information such as types of accounts associated with a customer, types of services or products associated with a customer (e.g., loans, retirement accounts, savings account, checking account, and the like). This information may be used by the waiver identification module 204 to determine one or more waivers available or applicable to a customer, account, transaction, and the like.

The system 200 may further include a user device, such as computer 208. The user device 208 may be used to access the waiver identification module 204. For instance, a transaction may be conducted at a financial institution (such as entity 202) and may be processed via computer 208. The waiver identification module 204 may receive transaction information and identify one or more fees associated with an account of the customer, with the transaction or with the customer. Further, the waiver identification module 204 may determine, based on various criteria of the account, customer, transaction, and the like, one or more waivers for the identified fees and may transmit the identified waivers to the computer 208.

Some example fees that may be identified may include fees for using an automated teller machine (ATM) not associated with the financial institution 202, fees for overdrawing an account, fees for not maintaining a minimum balance in an account, monthly maintenance fees, account service charges, check order fees, statement fees, check image fees, enclosure fees, and the like. In some examples, one or more waivers of the identified fees may be available to the customer. Applicable waivers may be identified, for example, based on customer information. For instance, a customer who has had a long standing relationship with the financial institution 202 may be eligible for a waiver for one or more fees. In other examples, a customer living in an area not having a branch of the financial institution within a certain distance may be eligible for one or more waivers of one or more fees.

In other examples, applicable waivers may be identified based on account criteria. For instance, a customer having a mortgage with the financial institution 202 may be eligible for one or more waivers of one or more fees associated with their checking account, savings account, and the like. In other examples, a customer having accounts that are linked together may be eligible for one or more waivers of one or more fees.

In still other examples, applicable waivers may be identified based on transaction or other information. For instance, the financial institution 202 may be offering a promotion (e.g., opening a new account, taking out a loan, using online banking, signing up for electronic statements, and the like) that may include one or more waivers of one or more fees for a predetermined period of time. For example, a customer opening a new account may take advantage of a promotion to waive maintenance fees on that account for six (6) months. In still other examples, the waivers identified as available for selection may be identified based on a criterion of an associate processing the transaction. For instance, a financial institution banking associate processing a transaction and having a supervisor role may have additional waivers available for selection than a banking associate not in a supervisory role.

The criteria for identifying waivers described above are merely some examples of criteria that may be used to identify one or more waivers. More or fewer criteria may be used without departing from the invention.

In some examples, the computer 208 may also be used to provide a history of any waivers previously associated with the customer, account, transaction, and the like. For instance, the user device 208 may, in some examples, be a computer of a banking associate at a financial institution 202. Upon receiving a request for a transaction at the computer 208, a user interface on the computer 208 may display any waivers associated with the account, customer, and the like or were previously associated with associated with the account, customer, and the like but may have expired. In some arrangements, the waiver history data may also include the name or other identifier of an associate who applied the waiver to the account, customer, and the like. This waiver history data may be stored in one or more data storage modules 206a-206d, or, in some examples, may be stored in the waiver identification module 204.

Figure 3:
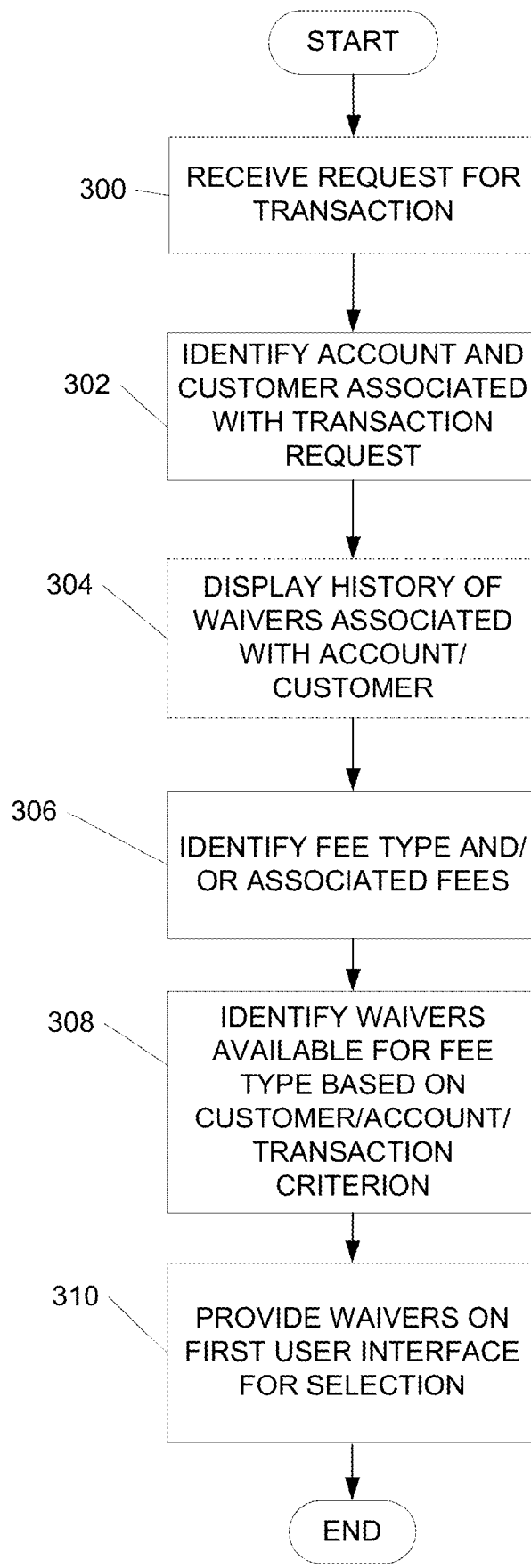
FIG. 3 illustrates one example method of identifying one or more applicable waivers according to one or more aspects described herein.

FIG. 3 illustrates one example method of identifying one or more applicable fee waivers. In step 300, a request for a transaction may be received. For example, a transaction request may be received at a user device (208 in FIG. 2). In some examples, a user device may be, for instance, a computer operated by a banking associate at a financial institution. In other examples, the user device may be a back office computing device that may be processing transactions that have taken place remotely from the back office computing device (e.g., at an ATM, via on-line banking, and the like). In step 302, a customer and one or more accounts associated with the transaction request are identified. This identification may be based on transaction information, as well as other information about the customer known by the financial institution (e.g., stored in data storage module 206a-206d). For instance, a customer may request a deposit to a savings account. This transaction request may provide information to identify a customer associated with that account, as well as other accounts held by the customer, the type of accounts, an overall amount of funds associated with the customer and the financial institution, loans held by the customer with the financial institution, and the like.

In optional step 304, a waiver history associated with the customer or account may be displayed. In some examples, the waiver history may be displayed on user device (such as user device 208). For instance, in some arrangements, the user device may be a banking associate computer. Accordingly, when the transaction is processed by the banking associate, a waiver history may appear for the customer requesting the transaction, or for one or more accounts associated with that customer. Additionally or alternatively, the banking associate may access a waiver system or waiver processing system in order to prompt appearance of the waiver history information.

In step 306, a fee type associated with the customer, account, and the like is identified. In some examples, fees associated with the identified fee type may also be identified. The fee or fee type may be any type of fee, as discussed above. In step 308, one or more waivers available to waive the identified fee or fee type may be determined, such as by the waiver identification module (204 in FIG. 2). In some examples, determination of the available fee waivers may be initiated by a banking associate. For instance, a banking associate may initiate a request for a waiver of the identified fee in order to release the customer from paying the fee.

The identified applicable waivers may be based on various criteria of the account, customer, and the like, as discussed above. In some examples, the applicable waiver(s) may be identified by a filtering process performed on all available waivers. For example, all waivers may be initially identified. The waivers may then be filtered based on one or more criteria of the account, customer, and the like to identify waiver(s) applicable to the customer, account, and the like. In step 310, the identified, applicable waiver(s), which may include waiver categories, reasons, and/or sub-reasons, may be provided for selection. For instance, the applicable waiver(s) and/or waiver categories, reasons, and sub-reasons may be provided to a banking associate computer (208 in FIG. 2), for selection by the banking associate. In some examples, a banking associate may select a waiver and/or waiver category, reason and/or sub-reason to waive the identified fee. Additionally or alternatively, one or more waivers may be automatically selected to waiver the identified fee or fee type.

Figure 4:
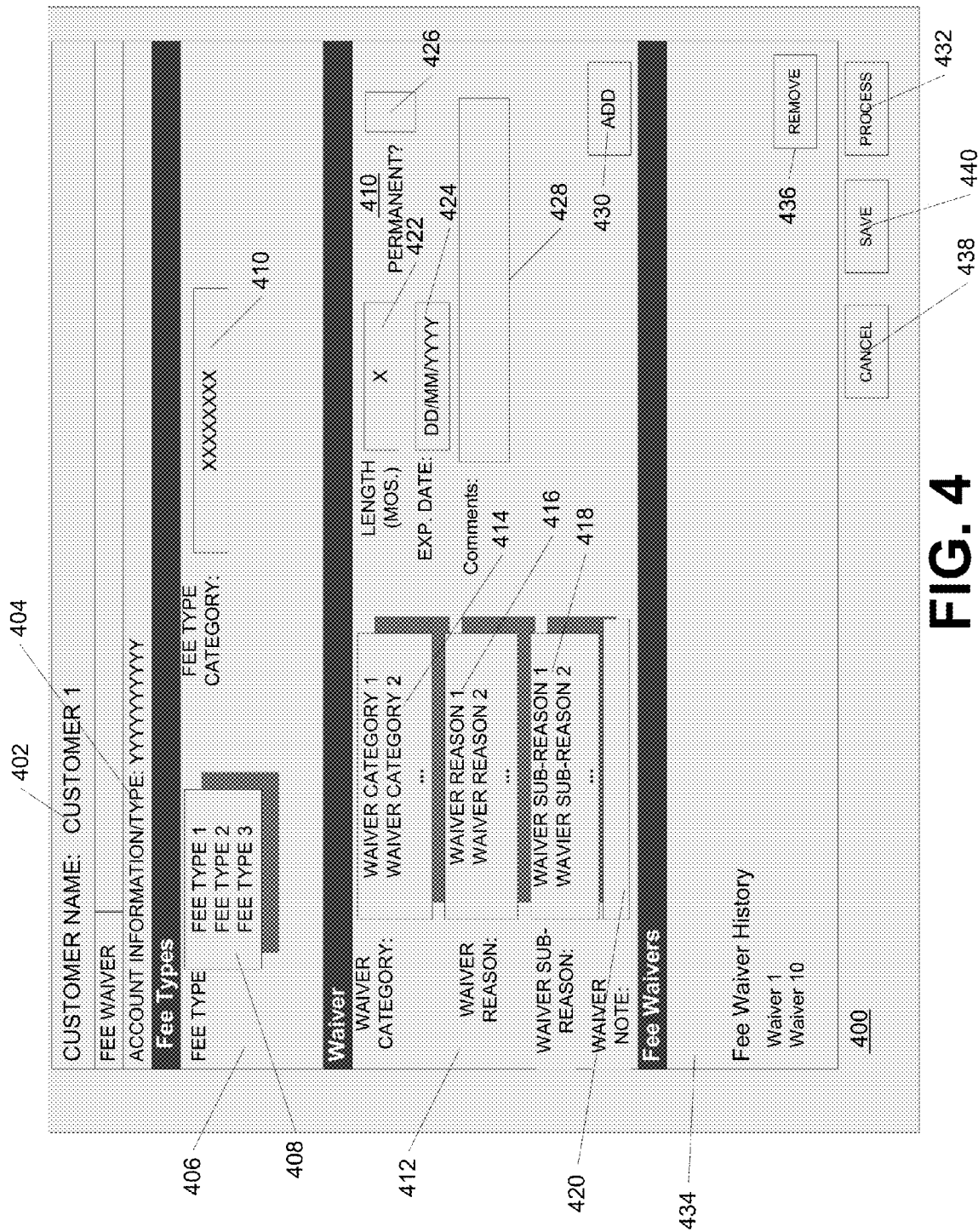
FIG. 4 illustrates one example user interface for providing customer information and waivers applicable to the customer or account according to one or more aspects described herein.

FIG. 4 illustrates one example user interface 400 providing customer and/or account information and waivers applicable to the customer or account. In some examples, the user interface 400, or a similar interface, may be provided to a banking associate at a financial institution processing a transaction.

The interface 400 includes a customer identification region 402. In some examples, a tier (not shown in FIG. 4) may be associated with the identified customer. For instance, if the customer has a certain type of account, has a minimum threshold amount of money in the financial institution, and the like the customer may be assigned a tier and may qualify for various services, promotions, and the like based on the identified tier. The interface 400 may further include an account information region 404. The account information region 404 may include information about one or more accounts associated with the customer. In some examples, the account information region 404 may include one or more loans (e.g., car loans, student loans, mortgages, and the like) associated with the customer, as well as retirement accounts, and the like.

The user interface 400 may include region 406 which may identify one or more fee types associated with the identified customer, account, and the like. The fee types may be listed in field 408 and a fee type category associated with the one or more fee types may be identified in field 410. A user, such as a bank employee, banking associate, and the like may select a fee type from region 408 to which a waiver may be applied. In some examples, deselection (e.g., clicking or double clicking on a selected fee) of one or more fees in region 406 may clear any fee selections made. Alternatively, a "clear" option may be provided to clear fee selections made.

User interface 400 may further include a waiver region 412. Waiver region 412 may provide a list of identified waivers that may be applicable to the identified/selected fee for the account, customer, and the like. The waivers shown in region 412 may be identified based on one or more criteria of the customer, account, and the like, as discussed above. In some examples, a user (e.g., a banking associate or bank employee processing the transaction) may select one or more of the listed waivers which may include a waiver category (field 414), waiver reason (field 416) or waiver sub-reason (418). Region 412 may also include a waiver note field 420 in which a banking associate may insert one or more notes. Further, the interface 400, and region 412, may include an indication of a length of the waiver to be applied in field 422 and, in some arrangements, an expiration date of the waiver in field 424. Region 412 may also include an indication of whether the waiver is a permanent waiver (i.e., has no expiration date) in field 426. Region 428 provides a field for inserting one or more comments. Selection of "add" option 430 may process the selection of the waiver and, in some instances, apply the waiver for the fee(s) selected (e.g., in region 406) for the customer, account, and the like. Alternatively, selection of "process" option 432 may process the selections made.

The user interface 400 may further include a waiver history region 434 including waivers that may be active or expired. In some alternate examples, the waiver history region 434 may include only active waivers while expired waivers (or a listing of both active and expired waivers) may be displayed on another, separate interface, as will be discussed more fully below. The waiver history region 434 may include information about one or more waivers applied to one or more accounts or fees of the customer (e.g., waiver 10). In some examples, the waiver history region may indicate when the waiver was applied, which banking associate applied the waiver, the length or duration of the waiver, and the like. Region 434 may further include a "remove" option 436. Selection of "remove" option 436 may delete a waiver applied to a fee.

Selection of "cancel" option 438 may clear all selections made in the user interface 400 and selection of "save" option 440 may save the information in the interface 400 until a later time. In some examples, saving the information may not process the waiver but rather will store the information until the waiver is processed.

FIG. 5 illustrates one example user interface displaying active and/or expired fee waivers as identified by the waiver identification system. The interface 500 includes a customer and/or account identification region 502 and a fee waiver history region 504. Fee waiver history region 504 may include active and/or expired fee waivers for the customer, account, and the like. In some examples, fee waiver history region may include all active and/or expired waivers 508 for the customer, account, and the like. In other examples, the fee waiver history region 504 may include active and/or expired waivers within a specified (dd/mm/yyyy to dd/mm/yyyy) or predetermined time period (six months, one year, ten years, and the like). In some examples, a user may select an option to display all fee waivers or select only active waivers. In some examples, a user may select to sort fee waivers by expiration date or other criteria to show active fee waivers at the top of the list.

User interface 500 may include information about the waivers, such as shown in field 506, and including waiver, date the waiver was placed, waiver reason, waiver sub-reason, start date of the waiver, expiration date of the waiver, who placed the waiver, and the like. Other information may also be provided, such as who approved the waiver, the waiver type and/or any comments.

Figure 6:
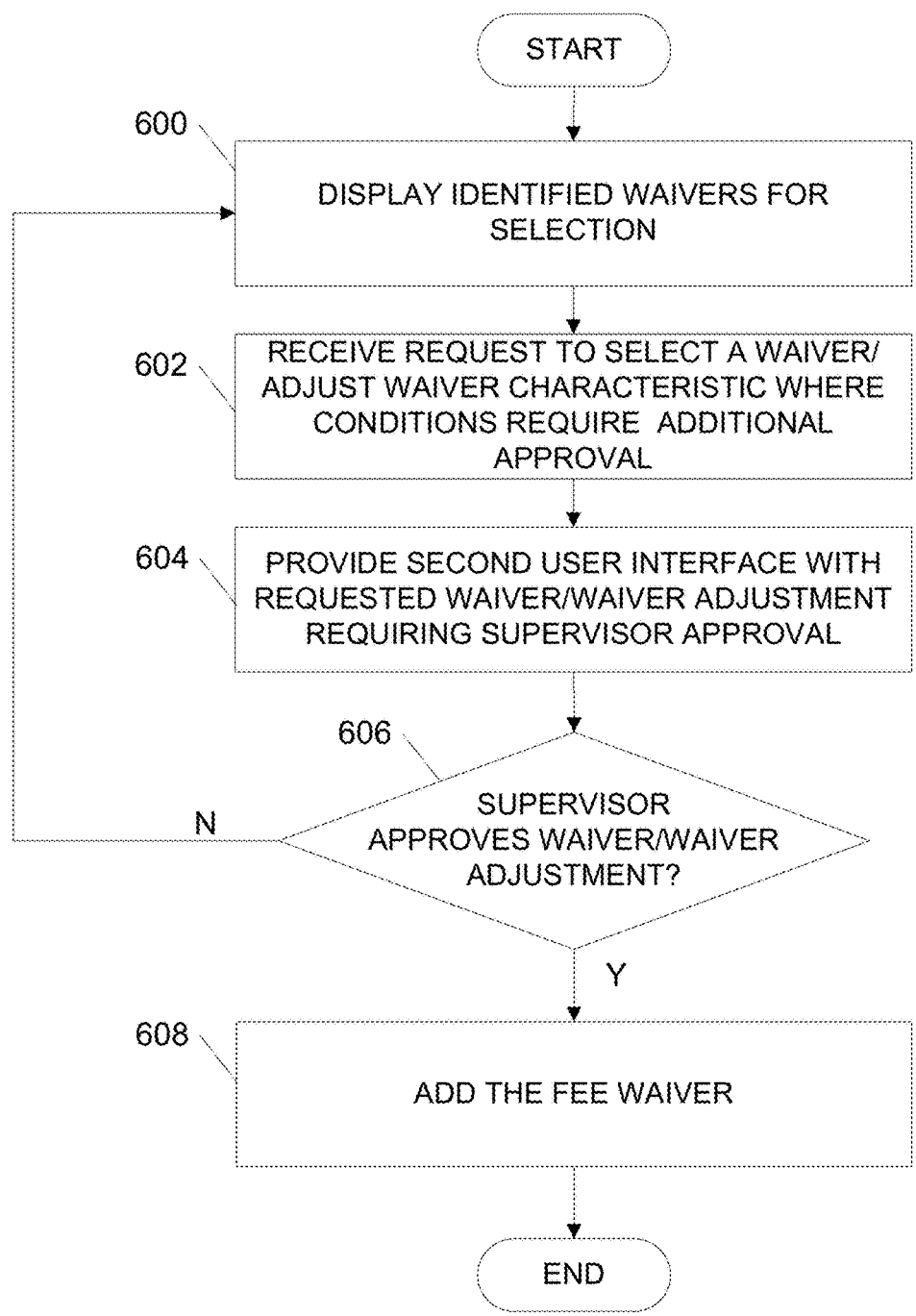
FIG. 6 illustrates one example method of selecting a waiver or adjusting a waiver characteristic including receiving approval according to one or more aspects described herein.

FIG. 6 illustrates one example method of requesting a waiver that may require additional approval or requesting adjustment of a waiver characteristic. As discussed above, in some instances, a bank employee or banking associate may desire to apply a discretionary waiver to a fee. Application of a discretionary waiver may require approval, such as supervisor approve, prior to processing or applying the waiver. Additionally or alternatively, a banking associate or bank employee may desire to adjust a characteristic of a selected waiver, e.g., waiver length, and the like. Adjustment of a waiver characteristic may also require approval, such as supervisor approval.

In step 600, waivers identified as applicable are provided for selection. Identification of applicable waivers may be performed using, for example, the method described in FIG. 3 and may be provided for selection in a first user interface. In step 602, a request for a waiver, such as a discretionary waiver, requiring additional approval, or an adjustment of a waiver characteristic is received. For instance, as discussed above, if a banking associate attempts to apply a discretionary waiver (e.g., a waiver not identified by the waiver identification system) to a fee, additional approval may be desired or required. In another example, a waiver may have a default term of applicability (e.g., 6 months, 1 year, and the like). At the end of the term, the waiver may, in some examples, automatically expire. Alternatively, a notification may be sent regarding expiration of the waiver and an extension may be applied. However, a user, such as a banking associate at a financial institution, may desire to adjust the term length of the waiver. For instance, the user may desire to extend a 6 month waiver to 1 year or a 1 year waiver to a lifetime waiver. This adjustment may be made when the waiver is applied or anytime throughout the term of the waiver. In some arrangements, adjustments such as these, it may be desirable or required to obtain supervisor approval. In step 604, a second user interface may be provided to obtain or receive supervisor or other approval. In some examples, the second user interface may identify the requested waiver override reason (e.g., discretionary waiver, adjustment of waiver characteristic) and may include one or more fields for obtaining desired or required approval (e.g., by a supervisor) prior to processing. In step 606 a determination is made as to whether the approval has been received. If so, the waiver (such as the discretionary waiver) may be added or the desired waiver adjustment may be performed. If approval is not received in step 606, the process may return to step 600 for selection of another waiver and/or waiver option.

Figure 7:
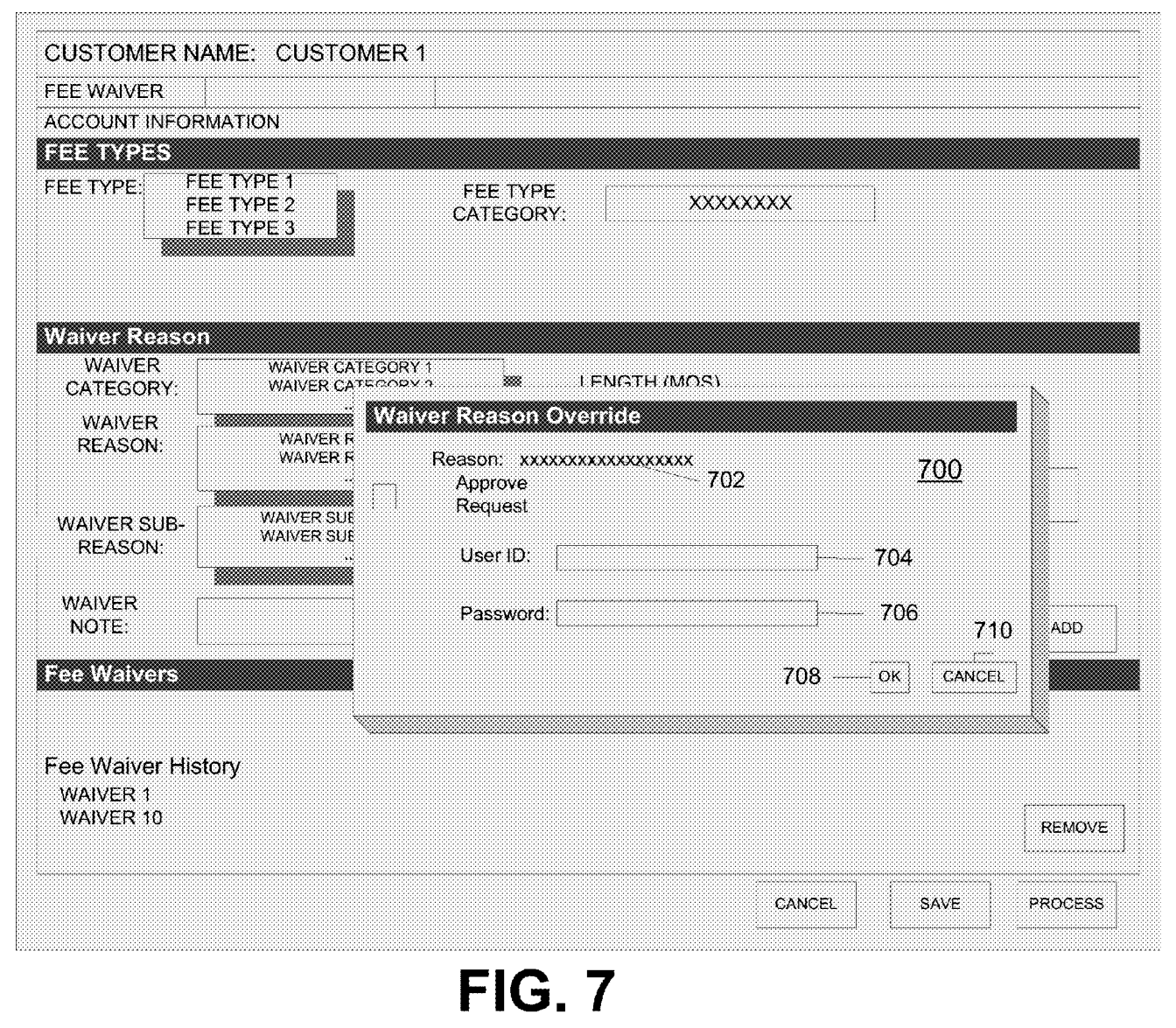

FIG. 7 illustrates one example user interface 700 provided for obtaining FIG. 6. The user interface 700 may, in some examples, appear overlaying a main or first user interface (e.g., interface 400 in FIG. 4) or, in some examples, may appear alone. The interface 700 includes field 702 identifying the requested waiver override reason. For instance, the override reason may include the desired discretionary waiver, desired adjustment to a waiver characteristic, and the like. In addition, the interface 700 includes field 704 for inserting an approver (e.g., supervisor) identifier, such as a name, identification number, employee number, and the like. Field 706 provides a region for inserting a password associated with the approver identifier, or other authenticating entry. If the supervisor approves the request for the waiver, "accept" option 708 may be selected and the waiver may be provided for selection or the adjustment may be permitted. Alternatively, "cancel" option 710 may be selected to decline the waiver or waiver adjustment request.

Figure 8:
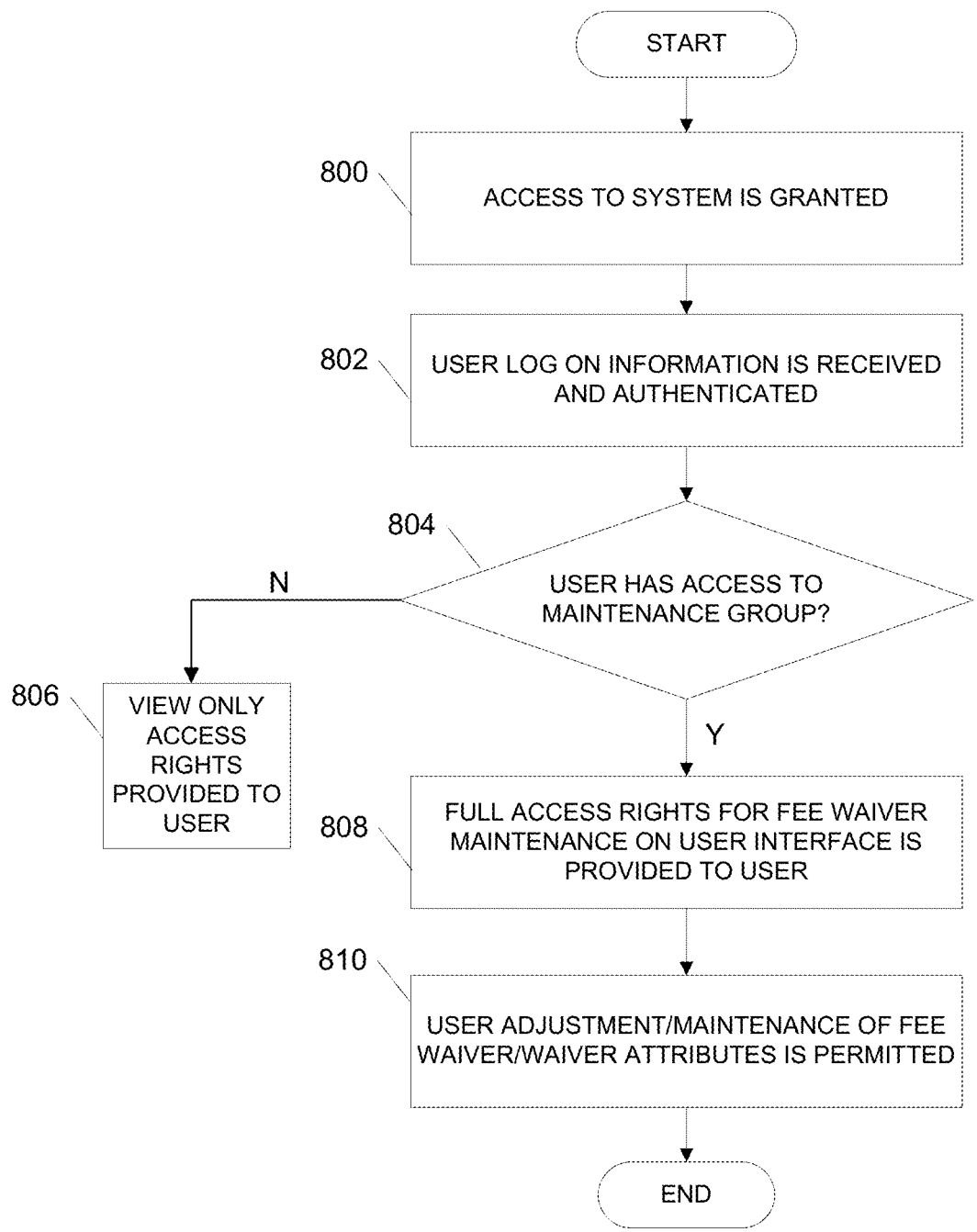
FIG. 8 illustrates one example method for providing maintenance access to various aspects of the fee waiver system according to one or more aspects described herein.

As discussed above, the waiver identification and processing system may include a user maintenance tool that may provide flexibility to modify the underlying business rules that drive the waiver identification and processing logic and functionality of the system. FIG. 8 illustrates one example method of maintaining fee waiver definitions utilizing a waiver definition module on a processing system similar to the system configuration in FIG. 2. In step 800, a user (e.g. a bank employee, banking associate, and the like) is granted access to the system. In some examples, this grant of access may be provided by, e.g., a business owner and, in some instances, may allow the user to access the user interface. Access may, in some arrangements, also include receiving applicable access rights for functionality within the fee waiver definition module. In step 802, user log on information may be received by the system and may be authenticated. In some examples, the system may use a standard or conventional sign-on interface with appropriate credentials (e.g. user identification number and password). In step 804, once the user is authenticated, a determination is made as to whether the authenticated user has access to a maintenance group. Access to the maintenance group may allow the user to manipulate or adjust waiver characteristics, qualifications, and the like. In some instances, a user having access to the maintenance group may define new waivers or delete current waivers so that they are no longer available for use. If, in step 804, the user does have access to the maintenance group, full access rights to fee waiver maintenance may be provided to the user in step 808. For instance, the user may perform any desired fee waiver maintenance, such as adding, editing, deleting waivers, and the like. In some instances, maintenance of the waivers may be performed via a user interface, as will be discussed more fully below. If, in step 804, the user does not have access to the maintenance group, view only access rights may be provided to the user in step 806.

In step 810, user adjustment/maintenance of fee waiver system may be provided. In some examples, the user may be presented with one or more maintenance category options (e.g. fee waiver category, reasons, and sub-reasons). The user may, in some examples, maintain definitions as directed by the business owner (e.g., add a new fee waiver category). Additional details of fee waiver maintenance will be discussed more fully below.

Figure 9:
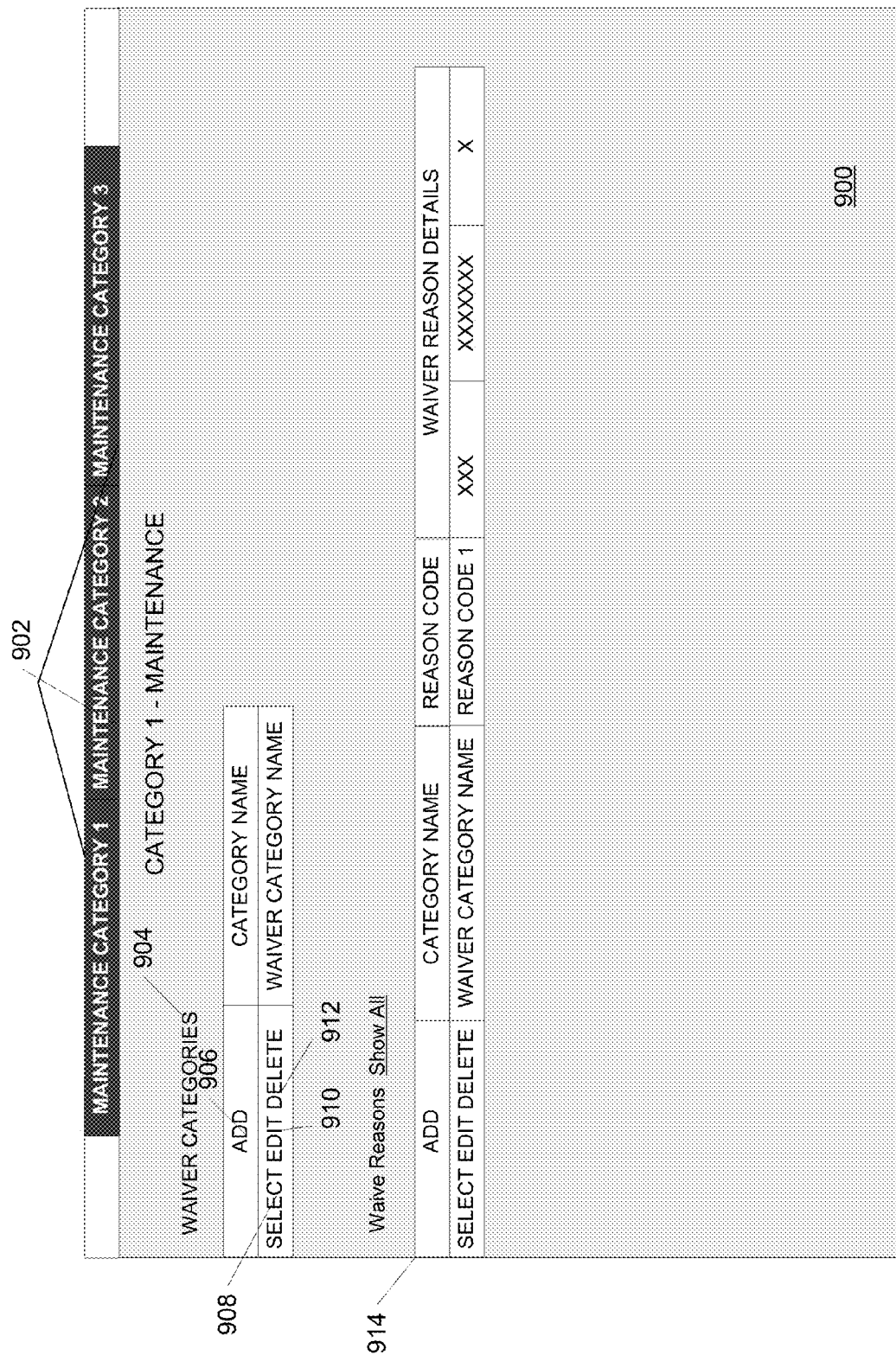
FIG. 9 illustrates an example user interface for maintaining fee waiver definitions according to one or more aspects described herein.

FIG. 9 illustrates one example user interface 900 provided for maintenance of fee waiver definitions, as discussed above with respect to FIG. 8. The interface 900 includes field 902 identifying a type of maintenance by category available for selection (e.g. fee waiver category and reasons). The user interface 900 may, in some examples, display alternative selections for maintenance based on a maintenance category type selected (e.g. user category and job roles). In some arrangements, interface 900 may include option 904 providing the display for all defined fee waiver categories. Field 906 may include an "add" option to add a new fee waiver category. In some examples, interface 900 may include option 908 to "select" the fee waiver category when one or more categories are displayed. When selection is made, in some examples, additional attributes may display and be available for maintenance as shown in field 914. Alternatively, in some examples, interface 900 may include option 910 to "edit" the attributes of the fee waiver category and include option 912 to "delete" the fee waiver category.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
receiving, by a waiver processing system of a financial institution, a request for a transaction associated with an account of a customer of the financial institution;
identifying a fee associated with at least one of: the account and the customer;
determining, by the waiver processing system, one or more fee waivers available to waive the identified fee based on one or more criteria of at least one of: the customer and the account, wherein determining the one or more fee waivers available to waive the identified fee based on the one or more criteria includes identifying fee waivers available to waive the identified fee and filtering the identified fee waivers available to waive the identified fee based on the one or more criteria, and wherein at least one of the one or more fee waivers requires supervisor approval for a length of time comprising one or more months that the at least one of the one or more fee waivers should be applied to the account of the customer of the financial institution;
providing, in a first user interface, the determined one or more fee waivers for selection;

displaying, on the first user interface, a history of one or more fee waivers associated with the account of the customer of the financial institution, and, for each of the one or more fee waivers, an identifier of a banking associate of the financial institution that applied the fee waiver to the account of the customer of the financial institution;

receiving user input indicating selection of the at least one of the one or more fee waivers requiring supervisor approval for the length of time comprising the one or more months that the at least one of the one or more fee waivers should be applied to the account of the customer of the financial institution;

responsive to receiving the user input indicating the selection of the at least one of the one or more fee waivers requiring supervisor approval for the length of time comprising the one or more months that the at least one of the one or more fee waivers should be applied to the account of the customer of the financial institution, providing a second user interface to obtain or receive the supervisor approval for the length of time comprising the one or more months that the at least one of the one or more fee waivers should be applied to the account of the customer of the financial institution;

receiving, via the second user interface, the supervisor approval for the length of time comprising the one or more months that the at least one of the one or more fee waivers should be applied to the account of the customer of the financial institution; and responsive to receiving the supervisor approval for the length of time comprising the one or more months that the at least one of the one or more fee waivers should be applied to the account of the customer of the financial institution, applying the at least one of the one or more fee waivers to the account of the customer of the financial institution for the length of time comprising the one or more months.

2. The method of claim 1, wherein the one or more criteria of the customer includes at least one of: length of relationship with the financial institution, amount of funds associated with the customer within the financial institution, and other accounts of the customer at the financial institution.

3. The method of claim 1, wherein the one or more criteria of the account includes at least one of: type of account, promotions available based on type of account, links between the account and other bank services offered.

4. The method of claim 1, further including:
determining that a desired waiver is not one of the determined one or more fee waivers for selection;
receiving, by the waiver processing system, a request to apply the desired waiver to the identified fee; and
applying the desired waiver to the fee with supervisor approval.

5. The method of claim 4, wherein providing the desired waiver to the fee with supervisor approval includes displaying a desired waiver override reason in a second user interface.

6. The method of claim 1, further including:
identifying a waiver feature for at least one of the one or more determined fee waivers;
receiving, by the waiver processing system, a request to alter the identified waiver feature of the at least one of the one or more determined fee waivers; and
receiving, by the waiver processing system, supervisor approval to alter the waiver feature prior to altering the waiver feature.

7. The method of claim 6, wherein the supervisor approval is received in a second user interface.

8. One or more non-transitory computer readable media storing computer readable instructions that, when executed, cause a waiver processing system of a financial institution to:
receive a request for a transaction associated with an account of a customer of the financial institution;
identify a fee associated with at least one of: the account and the customer;
determine one or more fee waivers available to waive the identified fee based on one or more criteria of at least one of: the customer and the account by identifying fee waivers available to waive the identified fee and filtering the identified fee waivers available to waive the identified fee based on the one or more criteria, wherein at least one of the one or more fee waivers requires supervisor approval for a length of time comprising one or more months that the at least one of the one or more fee waivers should be applied to the account of the customer of the financial institution;
provide, in a first user interface, the determined one or more fee waivers for selection;
display, on the first user interface, a history of one or more fee waivers associated with the account of the customer of the financial institution, and, for each of the one or more fee waivers, an identifier of a banking associate of the financial institution that applied the fee waiver to the account of the customer of the financial institution;
receive user input indicating selection of the at least one of the one or more fee waivers requiring supervisor approval for the length of time comprising the one or more months that the at least one of the one or more fee waivers should be applied to the account of the customer of the financial institution;
responsive to receiving the user input indicating the selection of the at least one of the one or more fee waivers requiring supervisor approval for the length of time comprising the one or more months that the at least one of the one or more fee waivers should be applied to the account of the customer of the financial institution, provide a second user interface to obtain or receive the supervisor approval for the length of time comprising the one or more months that the at least one of the one or more fee waivers should be applied to the account of the customer of the financial institution;
receive, via the second user interface, the supervisor approval for the length of time comprising the one or more months that the at least one of the one or more fee waivers should be applied to the account of the customer of the financial institution; and
responsive to receiving the supervisor approval for the length of time comprising the one or more months that the at least one of the one or more fee waivers should be applied to the account of the customer of the financial institution, apply the at least one of the one or more fee waivers to the account of the customer of the financial institution for the length of time comprising the one or more months.

9. The one or more non-transitory computer readable media of claim 8, wherein the one or more criteria of the customer includes at least one of: length of relationship with the financial institution, amount of funds associated with the customer within the financial institution, and other accounts of the customer at the financial institution.

10. The one or more non-transitory computer readable media of claim 8, wherein the one or more criteria of the account includes at least one of: type of account, promotions available based on type of account, links between the account and other bank services offered.

11. The one or more non-transitory computer readable media of claim 8, further including instructions that, when executed, cause the system to:
  determine that a desired waiver is not one of the determined one or more fee waivers for selection;
  receive, by the waiver processing system, a request to apply the desired waiver to the identified fee; and
  apply the desired waiver to the fee with supervisor approval.

12. The one or more non-transitory computer readable media of claim 11, wherein providing the desired waiver for selection with supervisor approval includes displaying a desired waiver override reason in a second user interface.

13. The one or more non-transitory computer readable media of claim 8, further including instructions for:
  identifying a waiver feature for at least one of the one or more determined waivers;
  receiving, by the waiver processing system, a request to alter the identified waiver feature of the at least one of the one or more determined waivers; and
  receiving, by the waiver processing system, supervisor approval to alter the waiver feature prior to altering the waiver feature.

14. The one or more non-transitory computer readable media of claim 13, wherein the supervisor approval is received in a second user interface.

15. An apparatus, comprising:
  at least one processor; and
  memory operatively coupled to the processor and storing computer readable instructions that, when executed, cause the apparatus to:
    receive a request for a transaction associated with an account of a customer of the financial institution;
    identify a fee associated with at least one of: the account and the customer;
    determine one or more fee waivers available to waive the identified fee based on one or more criteria of at least one of: the customer and the account by identifying fee waivers available to waive the identified fee and filtering the identified fee waivers available to waive the identified fee based on the one or more criteria, wherein at least one of the one or more fee waivers requires supervisor approval for a length of time comprising one or more months that the at least one of the one or more fee waivers should be applied to the account of the customer of the financial institution;
    provide, in a first user interface, the determined one or more fee waivers for selection;
    display, on the first user interface, a history of one or more fee waivers associated with the account of the customer of the financial institution, and, for each of the one or more fee waivers, an identifier of a banking associate of the financial institution that applied the fee waiver to the account of the customer of the financial institution;
    receive user input indicating selection of the at least one of the one or more fee waivers requiring supervisor approval for the length of time comprising the one or more months that the at least one of the one or more fee waivers should be applied to the account of the customer of the financial institution;
    responsive to receiving the user input indicating the selection of the at least one of the one or more fee waivers requiring supervisor approval for the length of time comprising the one or more months that the at least one of the one or more fee waivers should be applied to the account of the customer of the financial institution, provide a second user interface to obtain or receive the supervisor approval for the length of time comprising the one or more months that the at least one of the one or more fee waivers should be applied to the account of the customer of the financial institution;
    receive, via the second user interface, the supervisor approval for the length of time comprising the one or more months that the at least one of the one or more fee waivers should be applied to the account of the customer of the financial institution; and
    responsive to receiving the supervisor approval for the length of time comprising the one or more months that the at least one of the one or more fee waivers should be applied to the account of the customer of the financial institution, apply the at least one of the one or more fee waivers to the account of the customer of the financial institution for the length of time comprising the one or more months.

16. The apparatus of claim 15, wherein the one or more criteria of the customer includes at least one of: length of relationship with the financial institution, amount of funds associated with the customer within the financial institution, and other accounts of the customer at the financial institution.

17. The apparatus of claim 15, wherein the one or more criteria of the account includes at least one of: type of account, promotions available based on type of account, links between the account and other bank services offered.

18. The apparatus of claim 15, wherein the computer readable instructions further cause the apparatus to:
  determine that a desired fee waiver is not one of the determined one or more fee waivers for selection;
  receive, by the waiver processing system, a request to apply the desired waiver to the identified fee; and
  apply the desired waiver to the fee with supervisor approval.

19. The apparatus of claim 18, wherein providing the desired waiver for selection with supervisor approval includes displaying the desired waiver in a second user interface.

20. The apparatus of claim 15, wherein the computer readable instructions further cause the apparatus to perform:
  identifying a waiver feature for at least one of the one or more determined waivers;
  receiving, by the waiver processing system, a request to alter the identified waiver feature of the at least one of the one or more determined waivers; and
  receiving, by the waiver processing system, supervisor approval to alter the waiver feature prior to altering the waiver feature.

21. The apparatus of claim 20, wherein the supervisor approval is received in a second user interface.

* * * * *